(12) United States Patent
Amada et al.

(10) Patent No.: US 8,593,497 B2
(45) Date of Patent: Nov. 26, 2013

(54) FLOW GUIDE FOR OPTICAL SCANNING DEVICE AND IMAGE FORMING APPARATUS

(75) Inventors: Taku Amada, Kanagawa (JP); Tomohiro Nakajima, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 60 days.

(21) Appl. No.: 13/204,922

(22) Filed: Aug. 8, 2011

(65) Prior Publication Data

US 2012/0044316 A1 Feb. 23, 2012

(30) Foreign Application Priority Data

Aug. 20, 2010 (JP) ................................. 2010-184571

(51) Int. Cl.
*B41J 15/14* (2006.01)
*B41J 27/00* (2006.01)

(52) U.S. Cl.
USPC .......................................... 347/241; 347/256

(58) Field of Classification Search
USPC ....................... 347/3, 231, 241–245, 256–261
See application file for complete search history.

(56) References Cited

U.S. PATENT DOCUMENTS

| | | | |
|---|---|---|---|
| 6,285,482 B1 * | 9/2001 | Date | 359/196.1 |
| 6,424,447 B1 * | 7/2002 | Kaneko et al. | 359/216.1 |
| 6,680,789 B2 * | 1/2004 | Hosonuma | 359/216.1 |
| 7,038,825 B2 * | 5/2006 | Matsui et al. | 359/200.5 |
| 7,474,451 B2 * | 1/2009 | Yamakawa et al. | 359/216.1 |
| 7,667,726 B2 * | 2/2010 | Shoji et al. | 347/241 |
| 7,916,374 B2 | 3/2011 | Nakajima | |
| 7,956,882 B2 | 6/2011 | Nakajima | |
| 8,199,391 B2 * | 6/2012 | Nagase | 359/216.1 |
| 8,289,600 B2 * | 10/2012 | Yoshimura | 359/204.1 |
| 2008/0069585 A1 | 3/2008 | Amada | |
| 2008/0259430 A1 | 10/2008 | Fukushima et al. | |
| 2009/0323147 A1 | 12/2009 | Amada et al. | |
| 2010/0091083 A1 | 4/2010 | Itami et al. | |
| 2011/0182621 A1 * | 7/2011 | Hirakawa | 399/151 |

FOREIGN PATENT DOCUMENTS

| | | | | | |
|---|---|---|---|---|---|
| JP | 06175063 | A | * | 6/1994 | G02B 26/10 |
| JP | 06289313 | A | * | 10/1994 | G02B 26/10 |
| JP | 06308416 | A | * | 11/1994 | G02B 26/10 |
| JP | 10148784 | A | * | 6/1998 | G02B 26/10 |
| JP | 3192271 | | | 5/2001 | |
| JP | 2001249298 | A | * | 9/2001 | G02B 26/10 |
| JP | 2002-267990 | | | 9/2002 | |
| JP | 2007079515 | A | * | 3/2007 | G02B 26/10 |
| JP | 4007111 | | | 9/2007 | |
| JP | 2007233279 | A | * | 9/2007 | B41J 2/44 |
| JP | 2008-180972 | | | 8/2008 | |

OTHER PUBLICATIONS

U.S. Appl. No. 13/117,721, filed May 27, 2011, Amada, et al.

* cited by examiner

*Primary Examiner* — Hai C Pham
(74) *Attorney, Agent, or Firm* — Oblon, Spivak, McClelland, Maier & Neustadt, L.L.P.

(57) ABSTRACT

An optical scanning device that optically scans a surface to be scanned in a main-scanning direction includes a light source; an optical deflector that has a reflective surface rotating on an axis of rotation of the reflective surface and deflects a light beam emitted from the light source; a scanning optical system that guides the light beam deflected by the optical deflector to the surface to be scanned; and a flow guide member that is provided near the optical deflector and turns back a flow of air generated by rotation of the reflective surface toward the reflective surface.

9 Claims, 12 Drawing Sheets

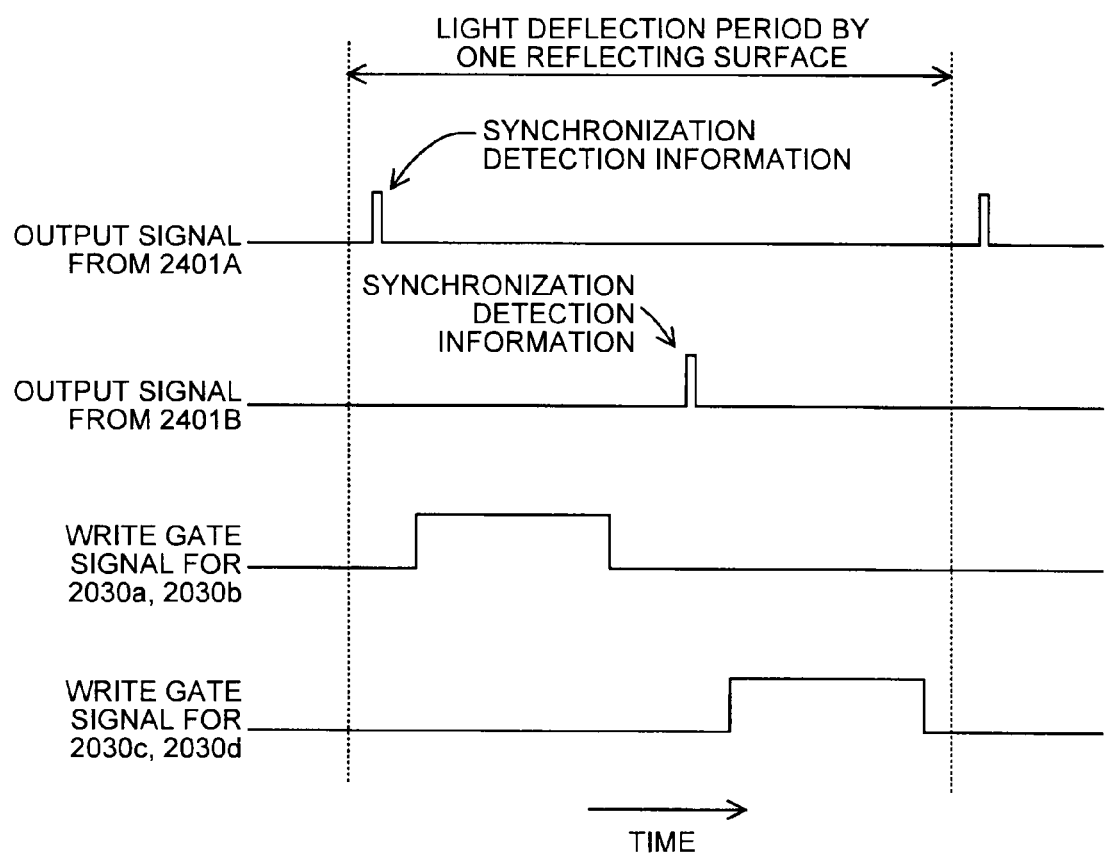

FLOW GUIDE FOR OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2010-184571 filed in Japan on Aug. 20, 2010.

BACKGROUND OF THE INVENTION

1. Field of the Invention

The present invention relates to an optical scanning device and an image forming apparatus, and more specifically relates to an optical scanning device that scans a surface to be scanned with light and an image forming apparatus including the optical scanning device.

2. Description of the Related Art

An image forming apparatus such as an optical printer, a digital copying machine, and an optical plotter includes an optical scanning device that scans a surface to be scanned with light modulated by image information to form a latent image on the surface based on the image information.

In the optical scanning device, a light beam emitted from a light source is deflected by a polygon mirror that rotates, for example (see Japanese Patent Application Laid-open No. 2008-180972, Japanese Patent Application Laid-open No. 2002-267990, Japanese Patent No. 4007111, and Japanese Patent No. 3192271, for example).

Because a polygon mirror rotates at a speed as high as several ten thousands in revolutions per minute (rpm), continuous rotation heats a drive mechanism (especially a bearing unit included in the drive mechanism).

In general, a polygon mirror is provided to a rotor. Heat generated at the bearing unit supporting the rotating shaft of the rotor may be conducted to the polygon mirror via the rotating shaft, thereby raising the temperature of the polygon mirror by several tens of degrees in centigrade. Accordingly, the rotation of the polygon mirror causes a flow of hot air that blows to a scanning lens and the like.

Recently, the number of scanning lenses made by resin mold has been increasing due to cost reduction. A loss of a uniform temperature distribution across a resinous scanning lens due to the flow of hot air blown by the polygon mirror may cause a change in refractive index, thermal deformation, a change in posture, and the like, whereby the performance of image formation is deteriorated.

With the downsizing of an optical scanning device, the diameter of a polygon mirror used in the optical scanning device is also decreased, whereby reducing the number of mirror facets mounted on the polygon mirror to further require a higher rotation speed, resulting in disadvantage by an increase of heat generation.

Conventionally, an optical scanning device has been provided with a cooling fan that forcibly causes a flow of air, having been taken in from outside the optical scanning device, to blow a polygon mirror and the optical scanning device, whereby the polygon mirror and the optical scanning device have been cooled. However, an increase in the speed of an image forming process in recent years has increased an amount of heat generation to cause a cooling fan to be driven to rotate even faster. A fast rotation of the cooling fan has caused an inconvenience with an increase of electricity consumption and noise increase.

SUMMARY OF THE INVENTION

It is an object of the present invention to at least partially solve the problems in the conventional technology.

According to an aspect of the present invention, there is provided an optical scanning device that optically scans a surface to be scanned in a main-scanning direction. The optical scanning device includes a light source; an optical deflector that has a reflective surface rotating on an axis of rotation of the reflective surface and deflects a light beam emitted from the light source; a scanning optical system that guides the light beam deflected by the optical deflector to the surface to be scanned; and a flow guide member that is provided near the optical deflector and makes a flow of air generated by rotation of the reflective surface return back to the reflective surface.

According to another aspect of the present invention, there is provided an image forming apparatus including: at least one image carrier; and an optical scanning device that optically scans a surface to be scanned in a main-scanning direction. The optical scanning device includes a light source; an optical deflector that has a reflective surface rotating on an axis and deflects a light beam emitted from the light source; a scanning optical system that guides the light beam deflected by the optical deflector to the surface to be scanned; and a flow guide member that is provided near the optical deflector and makes a flow of air generated by rotation of the reflective surface return back to the reflective surface. The optical scanning device scans the at least one image carrier with light modulated based on image information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a timing chart of synchronization detection signals and write gate signals;

DETAILED DESCRIPTION OF THE PREFERRED EMBODIMENTS

Figure 1:
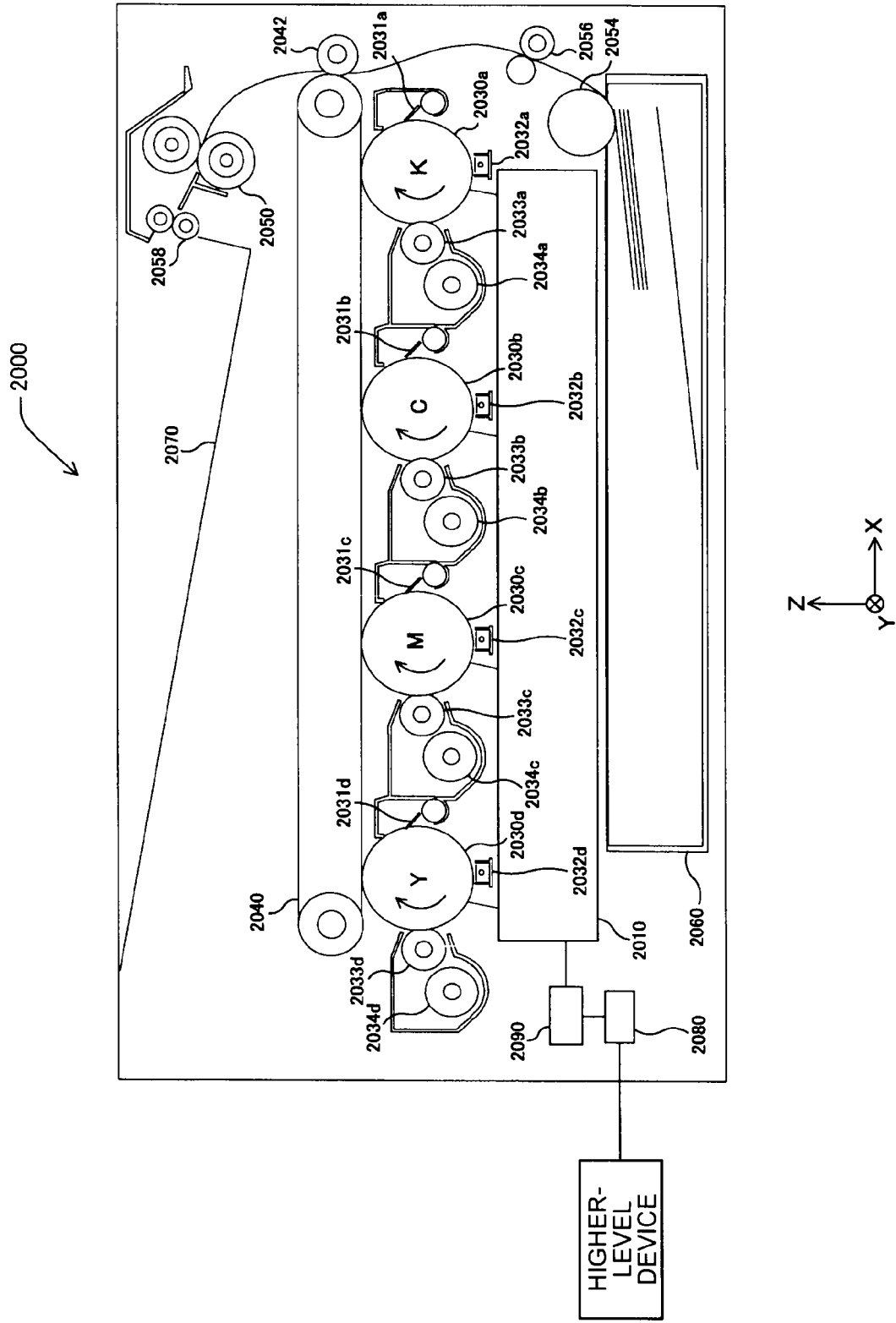
FIG. 1 is a schematic diagram illustrating a structure of a color printer according to an embodiment of the present invention.

One exemplary embodiment according to the present invention will now be described with reference to FIGS. 1 to 11. FIG. 1 is a schematic diagram illustrating a configuration of a color printer 2000 as an image forming apparatus according to the embodiment.

The color printer 2000 is a tandem-type multicolor printer that superimposes four colors (black, cyan, magenta, and yellow) to form a full-color image. The color printer 2000 includes an optical scanning device 2010, four photosensitive drums (2030a, 2030b, 2030c, 2030d), four cleaning units (2031a, 2031b, 2031c, 2031d), four charging units (2032a, 2032b, 2032c, 2032d), four developing rollers (2033a, 2033b, 2033c, 2033d), four toner cartridges (2034a, 2034b, 2034c, 2034d), a transfer belt 2040, a transfer roller 2042, a fixing roller 2050, a feeding roller 2054, a pair of registration rollers 2056, a discharging roller 2058, a paper feed tray 2060, a discharge tray 2070, a communication controller 2080, and a printer controller 2090 controlling the whole of the foregoing components.

The communication controller 2080 controls interactive communications with a higher-level device (for example, a personal computer) via a network and the like.

The photosensitive drum 2030a, the charging unit 2032a, the developing roller 2033a, the toner cartridge 2034a, and the cleaning unit 2031a are used as a set to configure an image forming station that forms a black image (hereinafter, also referred to as a "K station" for convenience).

The photosensitive drum 2030b, the charging unit 2032b, the developing roller 2033b, the toner cartridge 2034b, and the cleaning unit 2031b are used as a set to configure an image forming station that forms a cyan image (hereinafter, also referred to as a "C station" for convenience).

The photosensitive drum 2030c, the charging unit 2032c, the developing roller 2033c, the toner cartridge 2034c, and the cleaning unit 2031c are used as a set to configure an image forming station that forms a magenta image (hereinafter, also referred to as an "M station" for convenience).

The photosensitive drum 2030d, the charging unit 2032d, the developing roller 2033d, the toner cartridge 2034d, and the cleaning unit 2031d are used as a set to configure an image forming station that forms a yellow image (hereinafter, also referred to as a "Y station" for convenience).

A photosensitive layer is formed on a surface of each of the photosensitive drums. In other words, the surface of each of the photosensitive drums is a surface to be scanned. Each of the photosensitive drums is rotated by a rotating mechanism that is not shown in FIG. 1 in the directions indicated by each of the arrows in FIG. 1. The three-dimensional Cartesian coordinate system, with the axes denoted by X, Y, and Z, is used in the following description, with the axes assigned such that the Y-axis is set to be parallel to the longitudinal direction of each of the photosensitive drums and the X-axis is set to be parallel to the aligning direction of the four photosensitive drums.

Each of the charging units uniformly charges the surface of the photosensitive drum to be faced.

The optical scanning device 2010 is arranged on the −Z side of the four photosensitive drums. The optical scanning device 2010 irradiates light beams modulated for each of the colors according to the multicolor image information (black image information, cyan image information, magenta image information, and yellow image information) output from the higher-level device, to the surface of each of the charged photosensitive drums. Accordingly, the charge, on the surfaces of each of the photosensitive drums, is lost only from the portions irradiated with the light, whereby latent images corresponding to each color of the image information are formed on the surfaces of the photosensitive drums. The latent images thus formed move toward the developing rollers in association with the rotation of the photosensitive drums. The configuration of the optical scanning device 2010 will be described later.

The toner cartridge 2034a stores therein black toner, and the black toner is supplied to the developing roller 2033a. The toner cartridge 2034b stores therein cyan toner, and the toner is supplied to the developing roller 2033b. The toner cartridge 2034c stores therein magenta toner, and the toner is supplied to the developing roller 2033c. The toner cartridge 2034d stores therein yellow toner, and the toner is supplied to the developing roller 2033d.

In accordance with the rotation of each of the developing roller, the toner from the corresponding toner cartridge is applied thinly and uniformly to the surface of each of the developing rollers. The toner on the surface of each of the developing rollers transfers, when contacting the surface of the corresponding photosensitive drum, only onto the portions on the surface irradiated with the light and adheres thereto. In other words, each of the developing rollers makes the toner adhere to the latent image formed on the surface of the corresponding photosensitive drum visible. Each of the images to which the toners adhere (a toner image) moves to the transfer belt 2040 as each of the photosensitive drum rotates.

Each of the toner images in yellow, magenta, cyan, and black are sequentially transferred to the transfer belt 2040 at a predetermined timing and thereby superimposed to form a color image in multiple colors.

The paper feed tray 2060 stores therein recording sheets. The feeding roller 2054 is arranged near the paper feed tray 2060. The feeding roller 2054 picks up one recording sheet at a time from the paper feed tray 2060 and conveys the recording sheet to the pair of registration rollers 2056. The pair of registration rollers 2056 conveys the recording sheet to the gap between the transfer belt 2040 and the transfer roller 2042 at a predetermined timing, where the color image on the transfer belt 2040 is transferred to the recording sheet. The recording sheet with the color image thus transferred is conveyed to the fixing roller 2050.

The fixing roller 2050 applies heat and pressure on the recording sheet to fix the toner on the recording sheet. The recording sheet with the color image thus fixed is conveyed to the discharge tray 2070 via the discharging roller 2058 and is sequentially stacked on the discharge tray 2070.

Each of the cleaning units removes toner remaining on the corresponding photosensitive drum (residual toner). The surfaces of the photosensitive drums with the residual toner thus removed return to the positions facing the corresponding charging units.

The structure of the optical scanning device 2010 will be described hereinafter.

Figure 2:
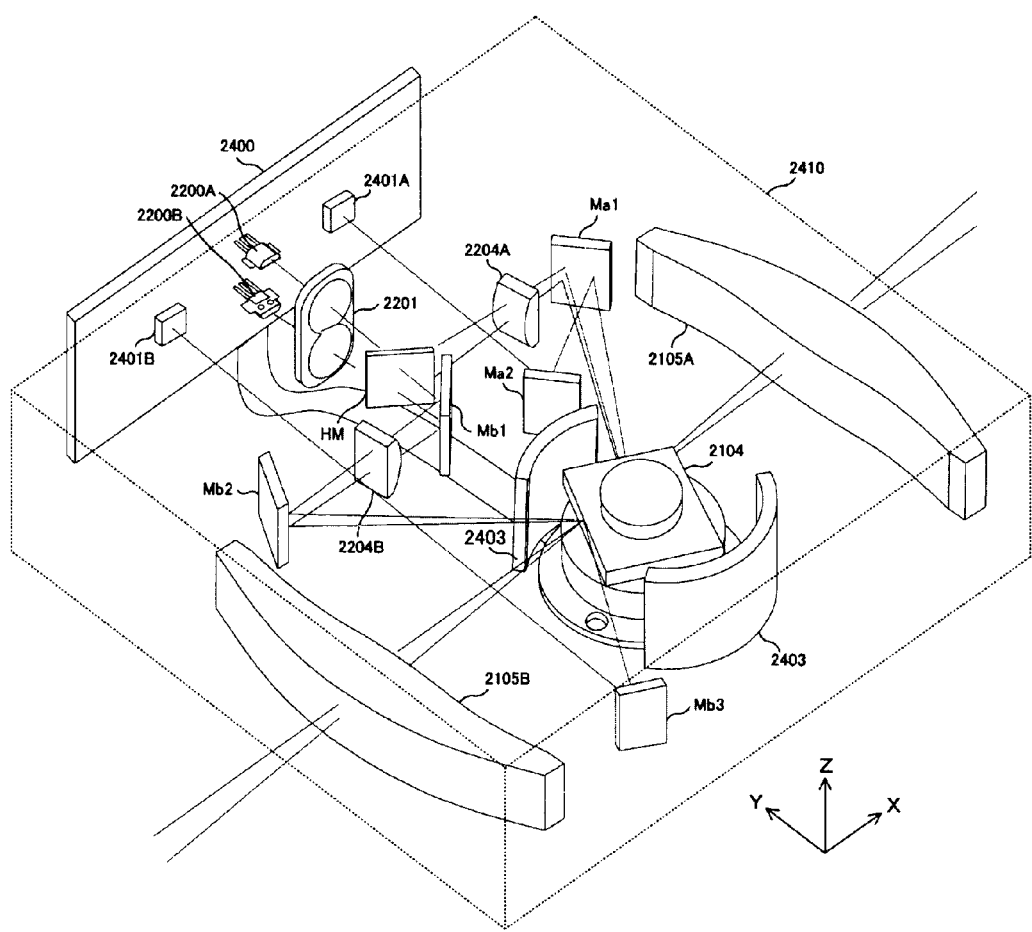
FIG. 2 is a diagram illustrating a configuration of an optical scanning device illustrated in FIG. 1 (part 1)
Figure 3:
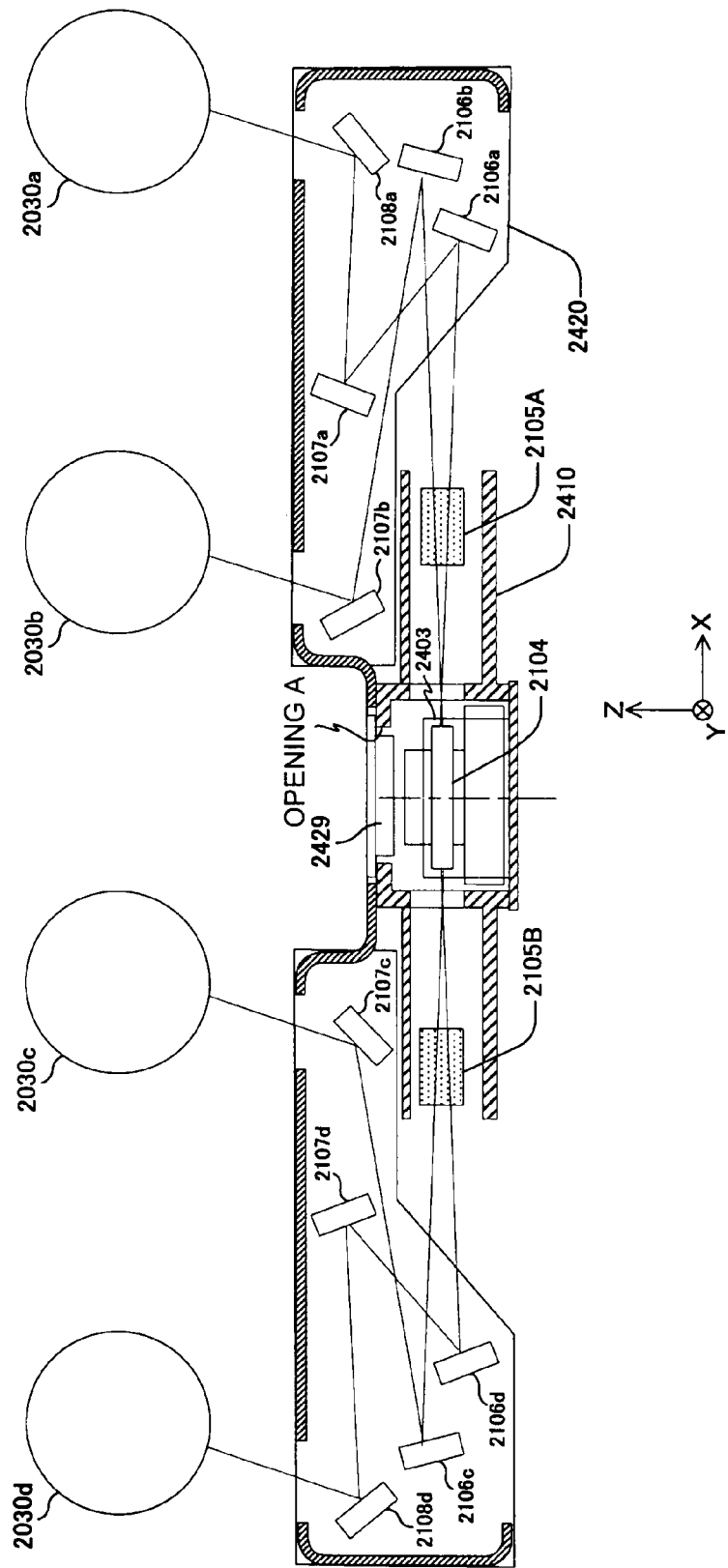
FIG. 3 is a diagram illustrating the configuration of the optical scanning device illustrated in FIG. 1 (part 2)

The optical scanning device 2010 includes, as illustrated in FIGS. 2 and 3 as an example, two light sources (2200A, 2200B), a coupling lens unit 2201, a half mirror HM, five reflecting mirrors (Ma1, Ma2, Mb1, Mb2, Mb3), two cylindrical lenses (2204A, 2204B), a polygon mirror 2104, two scanning lenses (2105A, 2105B), ten bending mirrors (2106a, 2106b, 2106c, 2106d, 2107a, 2107b, 2107c, 2107d,

2108a, 2108d), two synchronization detection sensors (2401A, 2401B), and a scanning controller that is not illustrated in FIG. 2 or FIG. 3.

In the following description, the direction corresponding to the main-scanning direction is referred to, in short, as the "main-scanning corresponding direction" and the direction corresponding to the sub-scanning direction is referred to, in short, as the "sub-scanning corresponding direction" for convenience.

Figure 4:
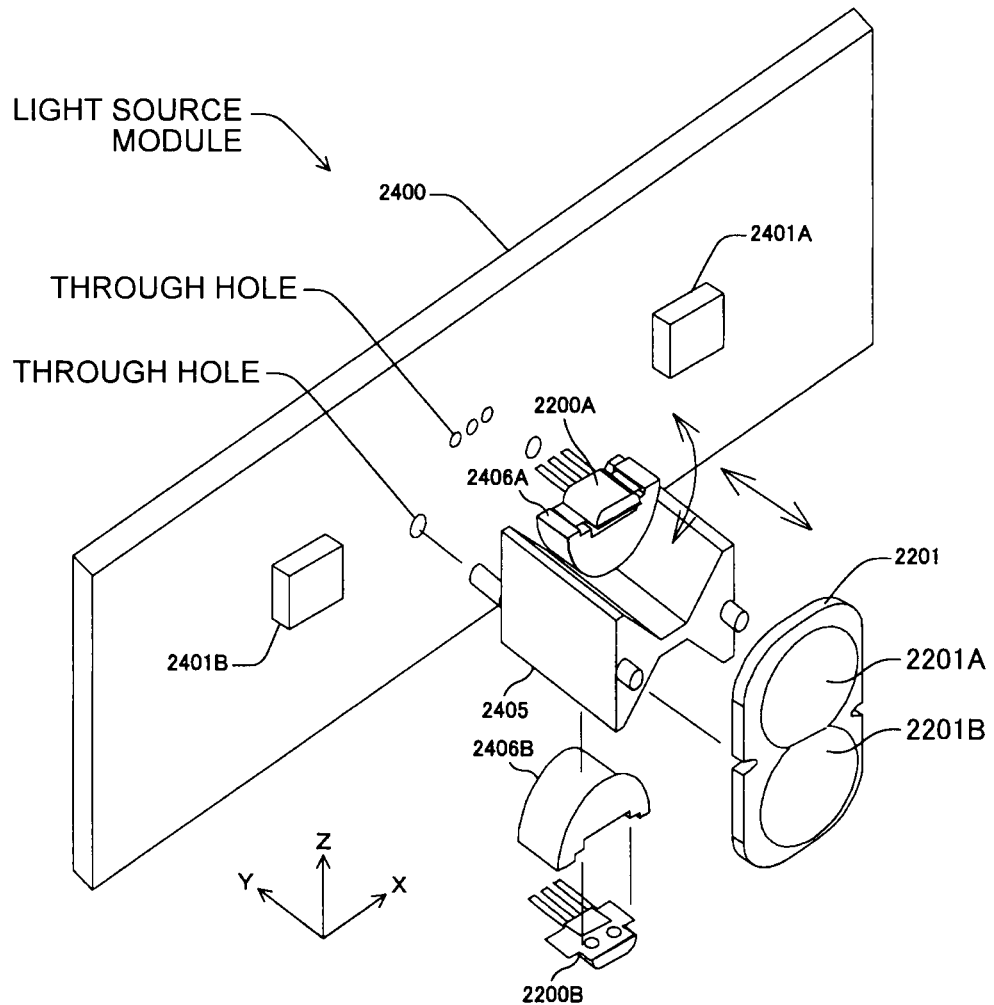
FIG. 4 is a perspective view illustrating a light source module.

As illustrated in FIG. 4 as an example, the two light sources (2200A, 2200B) configure a module with the coupling lens unit 2201, the two synchronization detection sensors (2401A, 2401B), and the like. The module is referred to as a "light source module" hereinafter.

Each of the light sources is a flat-package chip in which an end-face emitting type semiconductor laser (hereinafter, referred to as an "end-face emitting laser") having two monolithically formed light-emitting units (ch1, ch2) is packaged.

The end-face emitting laser generally has a double heterojunction structure in which a p-type semiconductor material and an n-type semiconductor material are joined together. When an electric current is injected into the junction, an active layer provided to the junction emits a laser beam.

The end-face emitting laser of each light source is fixed on a lead frame so that the active layer becomes parallel to a surface of the lead frame, and is covered with a resinous cover. Accordingly, a light beam from each light source is emitted parallel to the surface of the lead frame. The lead frame is provided with a plurality of lead terminals extending therefrom. Through holes into which the lead terminals are inserted are formed on a printed circuit board 2400.

The light source 2200A is held by a holder 2406A, and the light source 2200B is held by a holder 2406B.

Each of the holders is a member having a shape of a cylinder that is cut parallel to the axial direction. The light source is held on a section so that the emitting axis of the end-face emitting laser coincides with the axis of the cylinder.

Furthermore, each holder is supported by a supporting member 2405. The supporting member 2405 is a member having V-shaped grooves (hereinafter, referred to as "V-shaped grooves") on both the +Z side and on the −Z side. The holder 2406A is supported by the V-shaped groove on the +Z side, whereas the holder 2406B is supported by the V-shaped groove on the −Z side.

Each of the V-shaped grooves are tilted from the direction parallel to the Y-axis direction so that the light beam emitted from the light source 2200A and the light beam emitted from the light source 2200B intersect each other near a reflective surface of the polygon mirror 2104 with respect to the sub-scanning corresponding direction.

On the end face on the +Y side and on the end face on the −Y side of the supporting member 2405, two protrusions extending in the Y-axis direction are provided at positions apart in the X-axis direction. The two protrusions provided on the end-face in the −Y side are for positioning the coupling lens unit 2201, and the two protrusions provided on the end-face in the +Y side are inserted into the through holes of the printed circuit board 2400.

Figure 5:
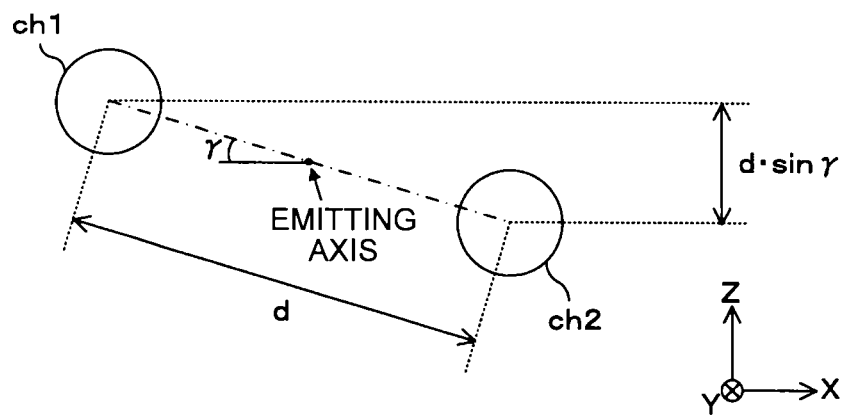
FIG. 5 is a schematic diagram illustrating rotational adjustment of a light source.

Each of the light sources can be turned (γ-turned) together with the holders around the emitting axis as illustrated in FIG. 5 as an example. For example, when the pixel density of latent images drawn on the surfaces of the photosensitive drums is 600 dpi (scanning line pitch: 42.3 micrometers) in the sub-scanning direction, the distance d between the two light-emitting units (ch1, ch2) is 50 micrometers, and the magnification of the entire system of the imaging optical system that configures the optical scanning device in the sub-scanning corresponding direction is 1.5, the tilt angle γ of the line connecting the two light-emitting units (ch1, ch2) with respect to the X-axis direction is $\sin^{-1}(42.3/1.5/50)=34.3°$. If the magnification of the entire system of the imaging optical system that configures the optical scanning device is two, the tilt angle γ is $\sin^{-1}(42.3/2/50)=25.0°$.

Procedures for assembling the light source module will be briefly described below.

(1) The two protrusions provided to the end face on the +Y side of the supporting member 2405 are inserted into the through holes of the printed circuit board 2400 to fix them together.

(2) Notches on the coupling lens unit 2201 are engaged with the two protrusions provided to the end face on the −Y side of the supporting member 2405, and the coupling lens unit 2201 is fixed to the supporting member 2405.

(3) The holder 2406A is placed on the V-shaped groove on the +Z side of the supporting member 2405. The holder 2406A is γ-turned so that the light source 2200A makes the tilt angle γ with the X-axis. The γ-turning is performed in a state in which the lead terminals electrically conducting to the light source 2200A are inserted into the corresponding through holes of the printed circuit board 2400. Therefore, the through holes are formed large enough so that the γ-turning be performed easily.

(4) The position of the holder 2406A in the Y-axis direction is adjusted so that the light beam emitted from the light source 2200A and passing through the coupling lens unit 2201 is a substantially parallel light beam. After the adjustment, a plurality of lead terminals electrically conducting to the light source 2200A are soldered to the corresponding through holes of the printed circuit board 2400. The holder 2406A is also fixed to the supporting member 2405 with an adhesive or the like.

(5) The printed circuit board 2400 is reversed and the holder 2406B is placed on the V-shaped groove on the supporting member 2405. The holder 2406B is γ-turned so that the light source 2200B makes the tilt angle γ with the X-axis. The γ-turning is performed in a state where the lead terminals electrically conducting to the light source 2200B are inserted into the corresponding through holes of the printed circuit board 2400. Therefore, the through holes are formed large enough for the γ-turning to be performed easily.

(6) The position of the holder 2406B in the Y-axis direction is adjusted so that the light beam emitted from the light source 2200B and passing through the coupling lens unit 2201 is a substantially parallel light beam. After the adjustment, the lead terminals electrically conducting to the light source 2200B are soldered to the corresponding through holes of the printed circuit board 2400. The holder 2406B is also fixed to the supporting member 2405 with an adhesive or the like.

The coupling lens unit 2201 has two lenses aligned along the Z-axis direction. The lens on the +Z side and the lens on the −Z side are respectively referred to as a lens 2201A and a lens 2201B hereinafter.

The lens 2201A is arranged on an optical path of the light beam emitted from the light source 2200A, and converts the light beam into a substantially parallel light beam.

The lens 2201B is arranged on an optical path of the light beam emitted from the light source 2200B, and converts the light beam into a substantially parallel light beam.

The two synchronization detection sensors (2401A, 2401B) are mounted on the surface of the printed circuit board 2400 on the −Y side at positions spaced apart in the X-axis direction. The synchronization detection sensor 2401A is mounted on the +X side of the light source, and the synchronization detection sensor 2401B is mounted on the −X side of the light source in the arrangement.

Furthermore, a scanning controller that, though not shown, is integrated with a chip is mounted on the +Y side of the printed circuit board 2400.

Referring back to FIG. 2, the half mirror HM is arranged on an optical path of a light beam coming through the lens 2201A and also on an optical path of a light beam coming through the lens 2201B, reflects a part of each of the light beams in the +X direction, and allows the rest of the light beams to pass through the half mirror HM. The ratio of the amount of passing light to the amount of reflected light is set to 1:1 herein.

The cylindrical lens 2204A is arranged on optical paths of the light beams reflected by the half mirror HM, and focuses the light beams onto the vicinity of a reflective surface of the polygon mirror 2104 with respect to the sub-scanning corresponding direction.

The reflecting mirror Ma1 reflects the light beams coming through the cylindrical lens 2204A toward the polygon mirror 2104.

The reflecting mirror Mb1 is arranged on optical paths of the light beams passing through the half mirror HM, and reflects the light beams to the −X direction.

The cylindrical lens 2204B is arranged on optical paths of the light beams reflected by the reflecting mirror Mb1, and focuses the light beams onto the vicinity of a reflective surface of the polygon mirror 2104 with respect to the sub-scanning corresponding direction.

The reflecting mirror Mb2 reflects the light beams coming through the cylindrical lens 2204B toward the polygon mirror 2104.

An optical system arranged between the light sources and the polygon mirror 2104 is referred to as a pre-deflector optical system. The pre-deflector optical system includes the coupling lens unit 2201, the half mirror HM, the three reflecting mirrors (Ma1, Mb1, Mb2), and the two cylindrical lenses (2204A, 2204B).

The reflecting mirror Ma2 is arranged on an optical path of the light beam that is deflected by the polygon mirror 2104 toward the reflecting mirror Ma1 and reflected by the reflecting mirror Ma1, and reflects the light beam toward the synchronization detection sensor 2401A. That is, the reflecting mirror Ma2 guides to the synchronization detection sensor 2401A a part of the light beam that is deflected by the polygon mirror 2104 and is not used for scanning the photosensitive drums.

The reflecting mirror Mb3 reflects toward the synchronization detection sensor 2401B a part of the light beam that is not used for scanning the photosensitive drums out of the light beam reflected by a reflective surface of the polygon mirror 2104.

In a description below, a light beam used for scanning the photosensitive drums is referred to as a "scanning light beam", and a light beam heading toward the synchronization detection sensors is referred to as a "synchronization detecting light beam".

The polygon mirror 2104 has a four-sided mirror for example, and each side of the mirror serves as a reflective surface. The polygon mirror 2104 rotates at a constant speed around an axis parallel to the Z-axis direction by a drive mechanism not depicted, and deflects an incident light beam. The rotation of the polygon mirror 2104 is controlled by the scanning control device.

When looked in the Z-axis direction, the light beam reflected by the half mirror HM is incident on the polygon mirror 2104 in the direction tilted clockwise from the direction that goes through the center of the polygon mirror 2104 and is parallel to the Y-axis. The scanning light beam reflected by the half mirror HM is deflected to the +X side of the polygon mirror 2104.

On the other hand, the light beam passing through the half mirror HM is incident on the polygon mirror 2104 in the direction tilted counterclockwise from the direction that goes through the center of the polygon mirror 2104 and is parallel to the Y-axis. The scanning light beam passing through the half mirror HM is deflected to the −X side of the polygon mirror 2104.

Concerning the Z-axis direction, the incident direction of each of the light beams to the polygon mirror 2104 is tilted with respect to the direction perpendicular to the Z-axis direction. That is, the light beams are obliquely incident on the polygon mirror 2104.

The scanning lens 2105A is arranged on optical paths of the light beams deflected on the +X side by the polygon mirror 2104.

The scanning lens 2105B is arranged on optical paths of the light beams deflected on the −X side by the polygon mirror 2104.

As illustrated in FIG. 3, the bending mirror 2106a is arranged on an optical path of the light beam coming from the light source 2200A through the scanning lens 2105A, and bends the light beam to the +Z side.

The bending mirror 2107a is arranged on an optical path of the light beam coming through the bending mirror 2106a, and bends the optical path of the light beam to the +X side.

The bending mirror 2108a is arranged on an optical path of the light beam coming through the bending mirror 2107a, and bends the optical path of the light beam toward the photosensitive drum 2030a.

In other words, the scanning light beam emitted from the light source 2200A and reflected by the half mirror HM is deflected to the +X side by the polygon mirror 2104, and is irradiated to the surface of the photosensitive drum 2030a via the scanning lens 2105A, the bending mirror 2106a, the bending mirror 2107a, and the bending mirror 2108a to form a light spot. The light spot moves in the longitudinal direction of the photosensitive drum 2030a in association with the rotation of the polygon mirror 2104 to scan the surface of the photosensitive drum 2030a. The moving direction of the light spot is a "main-scanning direction" on the photosensitive drum 2030a and the rotation direction of the photosensitive drum 2030a is a "sub-scanning direction" of the photosensitive drum 2030a.

In this manner, the scanning lens 2105A and the three bending mirrors (2106a, 2107a, 2108a) are included in a scanning optical system of the "K station".

The bending mirror 2106b is arranged on an optical path of the light beam coming from the light source 2200B through the scanning lens 2105A, and bends the optical path of the light beam to the +Z side.

The bending mirror 2107b is arranged on an optical path of the light beam coming via the bending mirror 2106b, and bends the optical path of the light beam toward the photosensitive drum 2030b.

In other words, the scanning light beam emitted from the light source 2200B and reflected by the half mirror HM is deflected to the +X side by the polygon mirror 2104, and is irradiated to the surface of the photosensitive drum 2030b via the scanning lens 2105A, the bending mirror 2106b, and the bending mirror 2107b to form a light spot. The light spot moves in the longitudinal direction of the photosensitive drum 2030b in association with the rotation of the polygon mirror 2104 to scan the surface of the photosensitive drum 2030*b*. The moving direction of the light spot is a "main-scanning direction" of the photosensitive drum 2030*b* and the rotating direction of the photosensitive drum 2030*b* is a "sub-scanning direction" of the photosensitive drum 2030*b*.

In this manner, the scanning lens 2105A and the two bending mirrors (2106*b*, 2107*b*) are included in a scanning optical system of the "C station".

The scanning lens 2105A is shared by the two image forming stations, i.e., the "K station" and the "C station".

The bending mirror 2106*c* is arranged on an optical path of the light beam coming from the light source 2200B through the scanning lens 2105B, and bends the optical path of the light beam to the +Z side.

The bending mirror 2107*c* is arranged on an optical path of the light beam coming through the bending mirror 2106*c*, and bends the optical path of the light beam toward the photosensitive drum 2030*c*.

In other words, the scanning light beam emitted from the light source 2200B and passing through the half mirror HM is deflected to the −X side by the polygon mirror 2104, and is radiated to the surface of the photosensitive drum 2030*c* via the scanning lens 2105B, the bending mirror 2106*c*, and the bending mirror 2107*c* to form a light spot. The light spot moves in the longitudinal direction of the photosensitive drum 2030*c* in association with the rotation of the polygon mirror 2104 to scan the surface of the photosensitive drum 2030*c*. The moving direction of the light spot is a "main-scanning direction" of the photosensitive drum 2030*c* and the rotating direction of the photosensitive drum 2030*c* is a "sub-scanning direction" of the photosensitive drum 2030*c*.

In this manner, the scanning lens 2105B and the two bending mirrors (2106*c*, 2107*c*) are included in a scanning optical system of the "M station".

The bending mirror 2106*d* is arranged on an optical path of the light beam coming from the light source 2200A through the scanning lens 2105B, and bends the optical path of the light beam to the +Z side.

The bending mirror 2107*d* is arranged on an optical path of the light beam coming through the bending mirror 2106*d*, and bends the optical path of the light beam to the −X side.

The bending mirror 2108*d* is arranged on an optical path of the light beam coming via the bending mirror 2107*d*, and bends the optical path of the light beam toward the photosensitive drum 2030*d*.

In other words, the scanning light beam emitted from the light source 2200A and passing through the half mirror HM is deflected to the −X side by the polygon mirror 2104, and is irradiated to the surface of the photosensitive drum 2030*d* via the scanning lens 2105B, the bending mirror 2106*d*, the bending mirror 2107*d*, and the bending mirror 2108*d* to form a light spot. The light spot moves in the longitudinal direction of the photosensitive drum 2030*d* in association with the rotation of the polygon mirror 2104 to scan the surface of the photosensitive drum 2030*d*. The moving direction of the light spot is a "main-scanning direction" of the photosensitive drum 2030*d* and the rotating direction of the photosensitive drum 2030*d* is a "sub-scanning direction" of the photosensitive drum 2030*d*.

In this manner, the scanning lens 2105B and the three bending mirrors (2106*d*, 2107*d*, 2108*d*) are included in a scanning optical system of the "Y station".

The scanning lens 2105B is shared by the two image forming stations, i.e., the "M station" and the "Y station".

A light beam before starting to write is incident on each of the synchronization detection sensors. Each of the synchronization detection sensors outputs a signal corresponding to the amount of received light to the scanning control device.

Based on the output signals of each of the synchronization detection sensors (synchronization detection signals), the scanning control device determines the timing to start writing for the corresponding photosensitive drums.

Figure 6A:
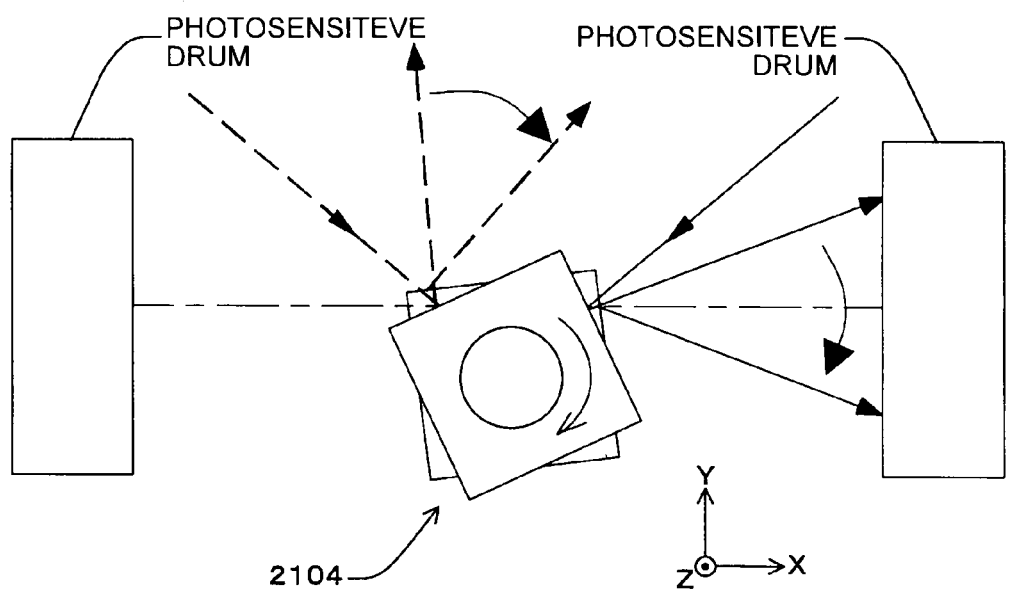
FIG. 6A is a schematic diagram illustrating a scanning process in which a light beam that is reflected by a half mirror scans a corresponding photosensitive drum.

In the present embodiment, when the light beams reflected by the half mirror HM are deflected toward the corresponding photosensitive drums by the polygon mirror 2104, the light beams passing through the half mirror HM are deflected by the polygon mirror 2104 to directions different from the directions toward the photosensitive drums (see FIG. 6A).

Figure 6B:
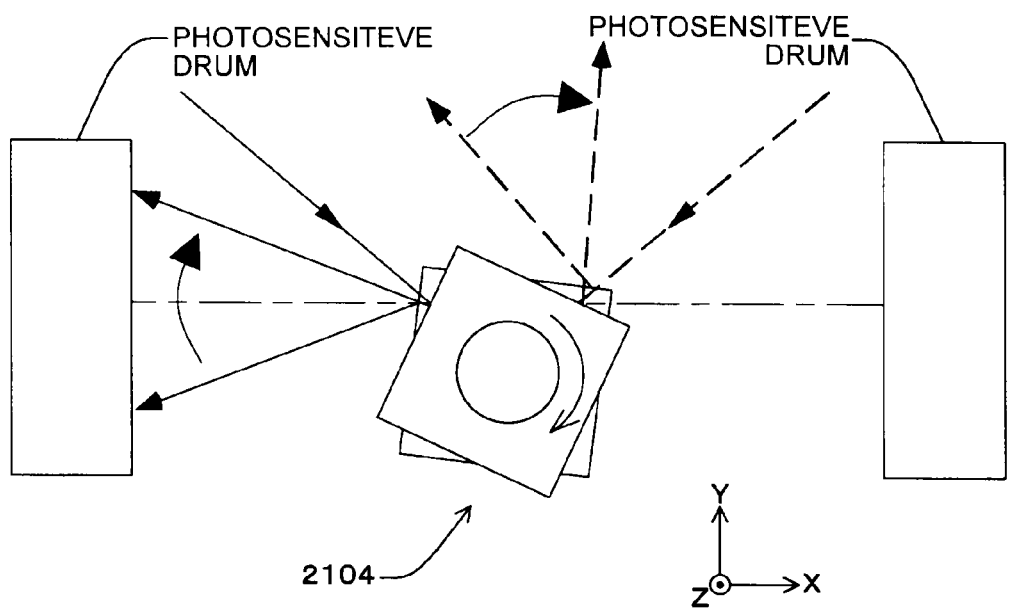
FIG. 6B is a schematic diagram illustrating a scanning process in which a light beam passes through the half mirror to scan a corresponding photosensitive drum.

On the other hand, when the light beams passing through the half mirror HM are deflected toward the corresponding photosensitive drums by the polygon mirror 2104, the light beams reflective by the half mirror HM are deflected to directions different from the directions toward the photosensitive drums by the polygon mirror 2104 (see FIG. 6B).

The scanning control device controls driving of the light sources according to the timing chart illustrated in FIG. 7, thereby drawing latent images in the corresponding colors on the surfaces of the four photosensitive drums with two light sources.

With the light beam deflected by one reflective surface of the polygon mirror 2104, two pieces of synchronization detection information are generated as a time series.

The scanning control device includes a phase locked loop (PLL) that constantly monitors the rotation of the polygon mirror to watch out for a phase shift with respect to a reference clock based on the synchronization detection signals and controls a clock to be input to the drive mechanism so as to prevent a phase shift. In other words, the scanning control device controls the rotation speed of the polygon mirror based on the synchronization detection signals so that a fluctuation in the rotation speed does not occur.

The optical scanning device 2010 provides a core unit 2410 that includes the pre-deflector optical system, the polygon mirror 2104, the two scanning lenses (2105A, 2105B), the reflecting mirror Ma2, and the reflecting mirror Mb3 (see FIG. 2). The printed circuit board 2400 is provided on a side plate of the core unit 2410.

As illustrated in FIG. 3, the plane on the +Z side of the polygon mirror 2104 in the core unit 2410 has an opening with a round shape (hereinafter, referred to as an "opening A"). The center of the opening A is on the rotational axis of the polygon mirror 2104. The opening A has a filter 2429.

Side plates of the core unit 2410 and flow guide walls 2403 have an effect of suppressing leakage of noise due to the rotation of the polygon mirror 2104.

The ten bending mirrors (2106*a*, 2106*b*, 2106*c*, 2106*d*, 2107*a*, 2107*b*, 2107*c*, 2107*d*, 2108*a*, and 2108*d*) are included in a subunit 2420.

Figure 8:
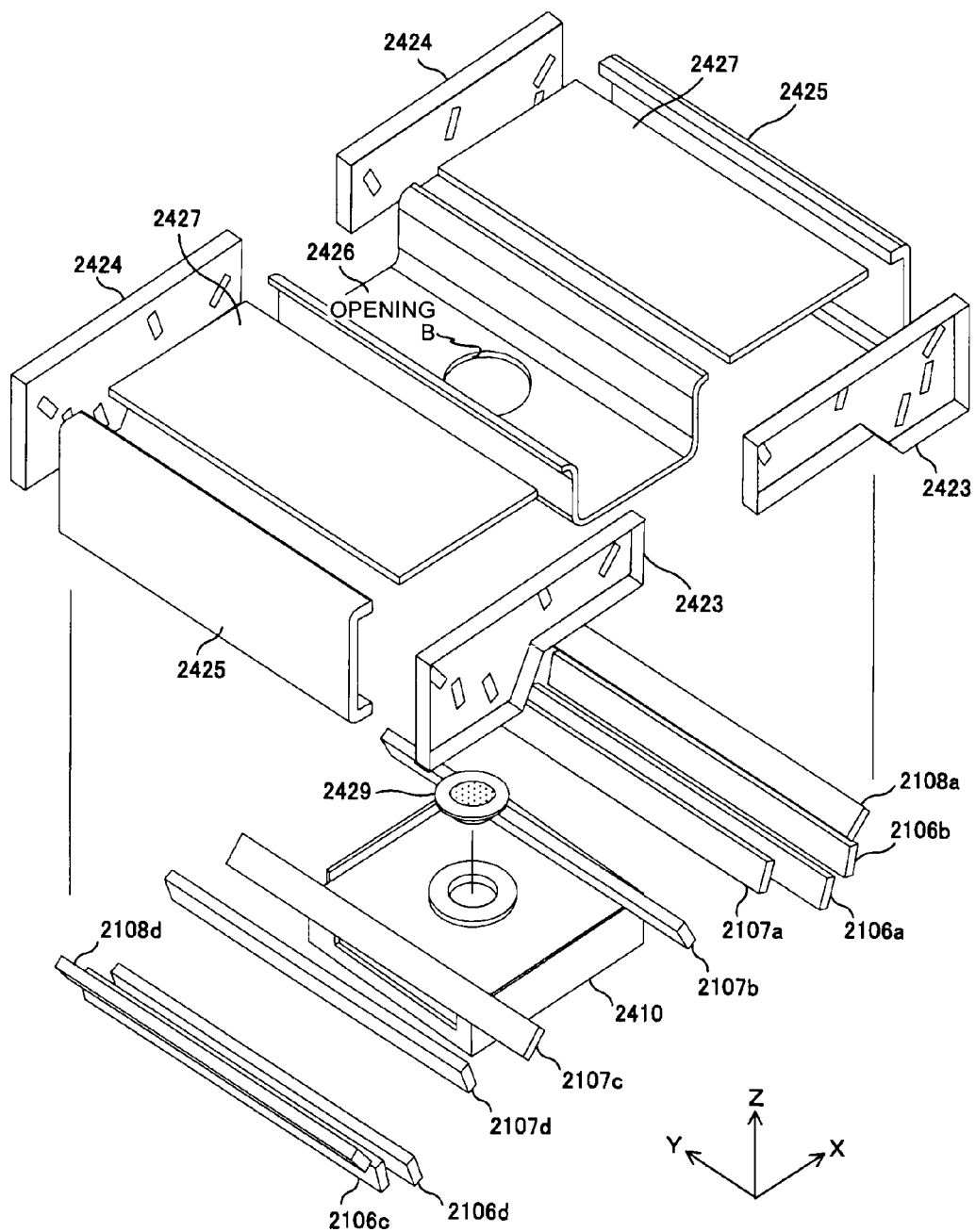
FIG. 8 is a diagram illustrating a subunit.

The subunit 2420 is configured by side plates (2423, 2424) made of resin, spacing members (2425, 2426, 2427) made of sheet metal, and the like as illustrated in FIG. 8. The ten bending mirrors are held by each of the side plates.

The spacing member 2426 has an opening with a round shape at the center (hereinafter, referred to as an "opening B"). The subunit 2420 is placed on the +Z side of the core unit 2410 so that the center of the opening B nearly coincides with the center of the opening A in the Z-axis direction.

Figure 9:
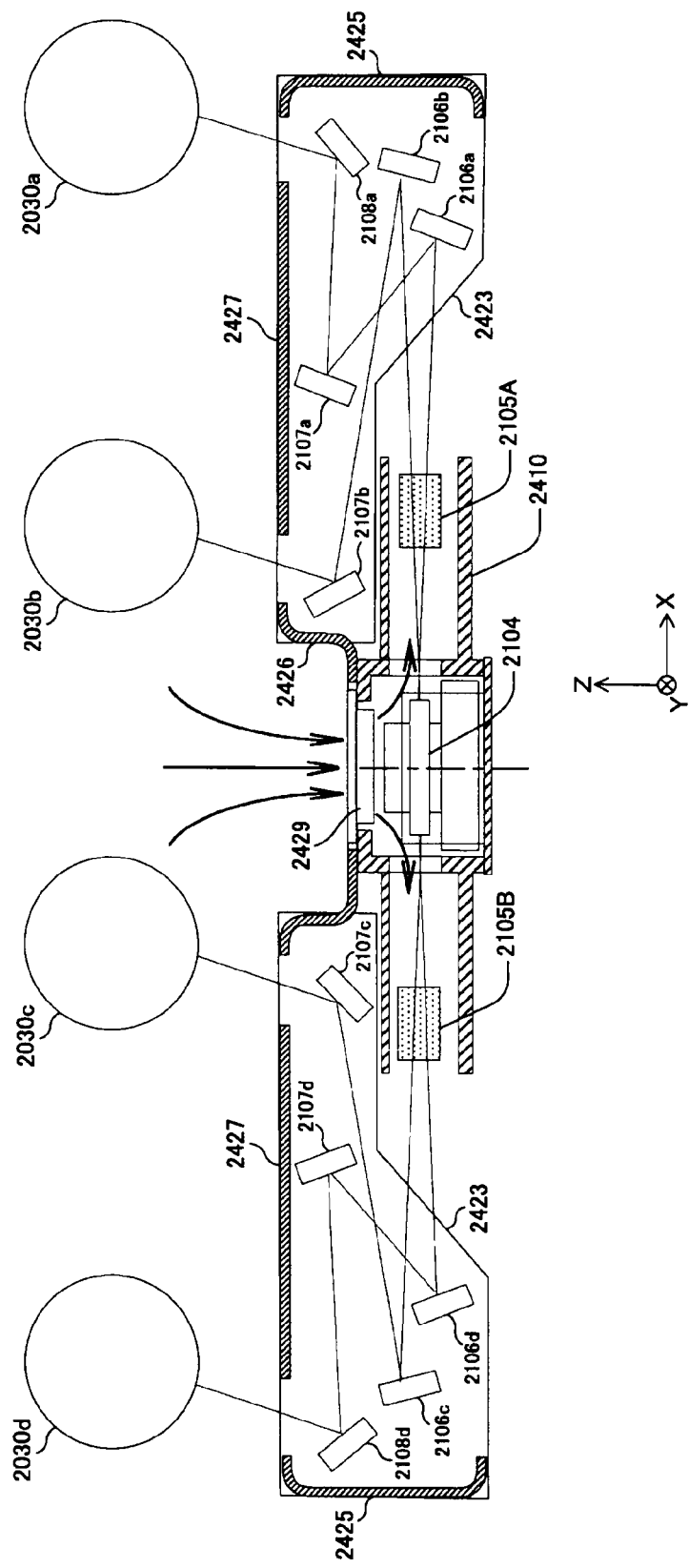
FIG. 9 is a diagram illustrating the method of taking in air from outside.

When the polygon mirror 2104 rotates, as illustrated in FIG. 9 as an example, air passing through the opening B is supplied from the outside to the polygon mirror 2104 through the filter 2429.

Figure 10:
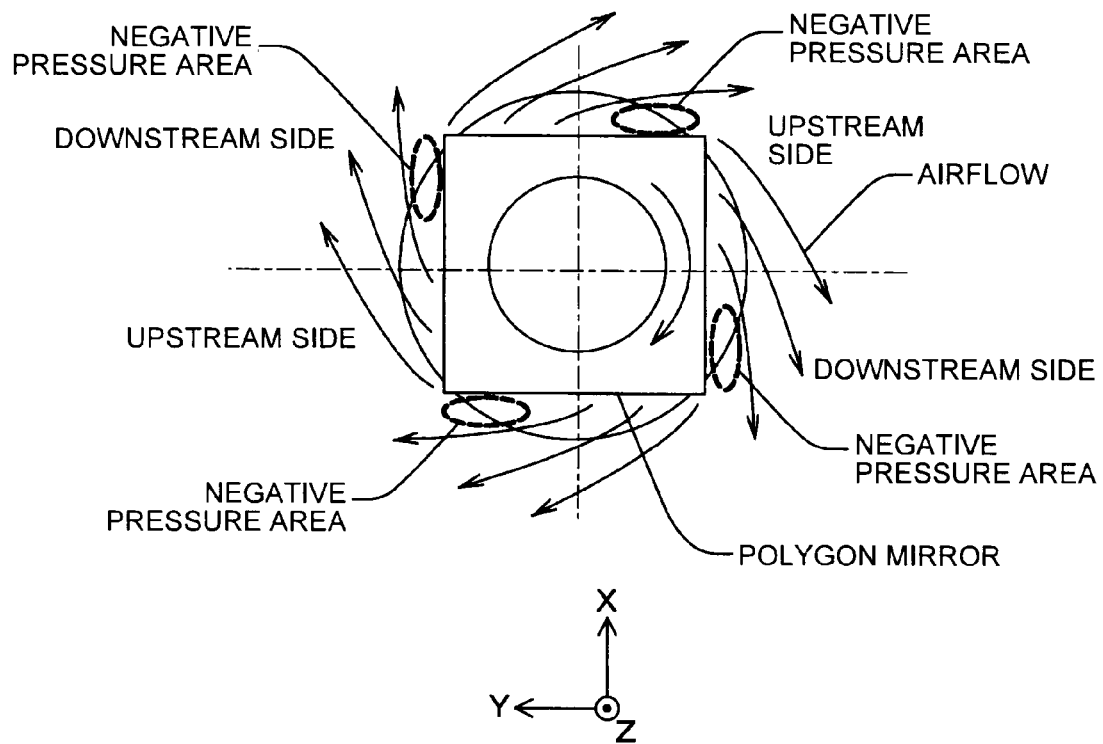
FIG. 10 is a schematic diagram illustrating a negative pressure region around a polygon mirror in a conventional optical scanning device.

The polygon mirror causes, by the rotation, a flow of air along the periphery of the polygon mirror as illustrated in FIG. 10. The flow of air in the upstream side near the polygon mirror is in the direction to leave the polygon mirror, whereas a flow of air in the downstream side becomes a flow along the reflective surfaces. Thus, the pressure becomes negative in localized areas on the downstream side indicated by the broken lines in FIG. 10, whereby the flows of air stagnate near the reflective surfaces. Accordingly, charged particles such as floating dust or scattered toner entering the core unit are attracted to the negative pressure areas and adhere to the reflective surfaces to cause the reflective surfaces to be clouded.

Figure 11:
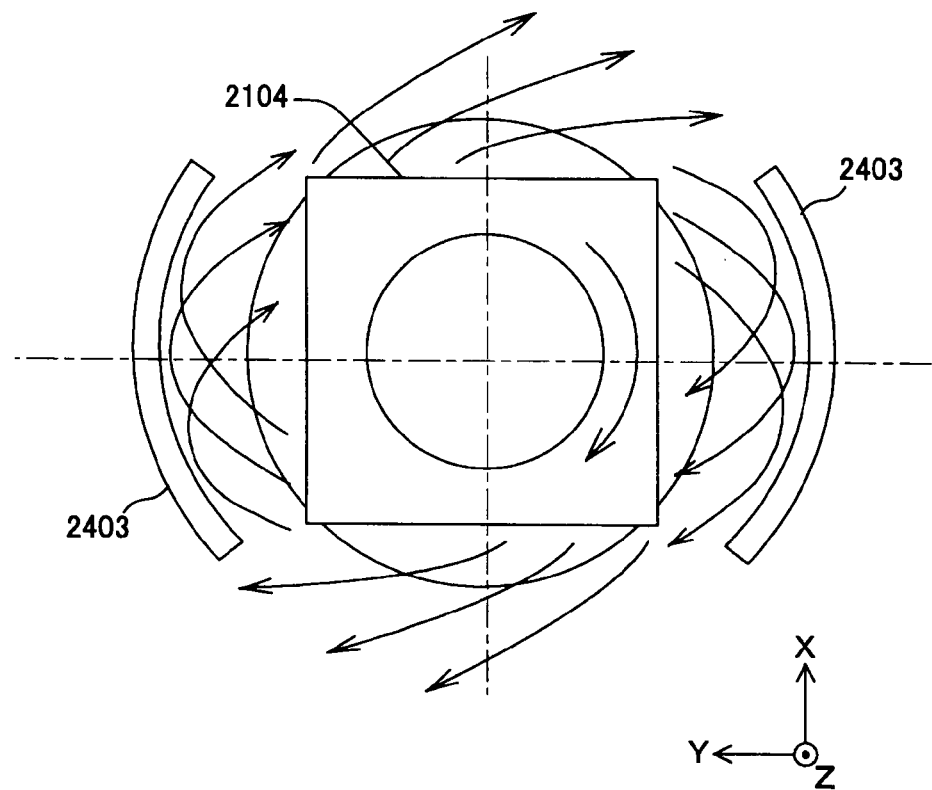
FIG. 11 is a schematic diagram illustrating an effect of a flow guide wall.

According to the present embodiment, the two flow guide walls 2403 facing each other in the Y-axis direction are provided, with the polygon mirror 2104 interposed therebetween. As illustrated in FIG. 11 as an example, the flow guide walls 2403 make the directions of the flows of air moving away from the reflective surfaces of the polygon mirror 2104 return back to the reflective surfaces. Consequently, vortexes are generated near the reflective surfaces and the flows of air near the reflective surfaces are disturbed, whereby the pressure near the reflective surfaces are made uniform. Accordingly, the negative pressure areas disappear, whereby the adhesion of charged particles such as floating dust or scattered toner entering the core unit to the reflective surfaces can be suppressed.

In addition, because the flows of air near the reflective surfaces are disturbed, the temperature of the air is made uniform. Furthermore, because the flow of air becomes faster near the reflective surfaces, heat generated by the high speed rotation of the polygon mirror 2104 is removed quickly, whereby an increase in the temperature of the polygon mirror is suppressed. Accordingly, the temperature of air blowing to the scanning lenses or the like can be kept low.

In other words, in the present embodiment, providing the two flow guide walls 2403 can prevent the reflective surfaces from being stained and can also suppress hot air to blow to the scanning lenses or the like.

Figure 12:
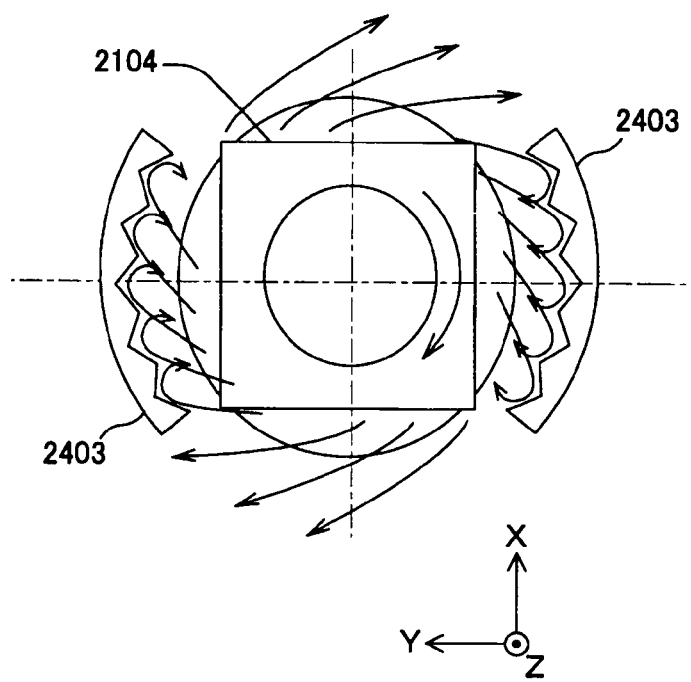
FIG. 12 is a schematic diagram illustrating a first modification of the flow guide wall.
Figure 13:
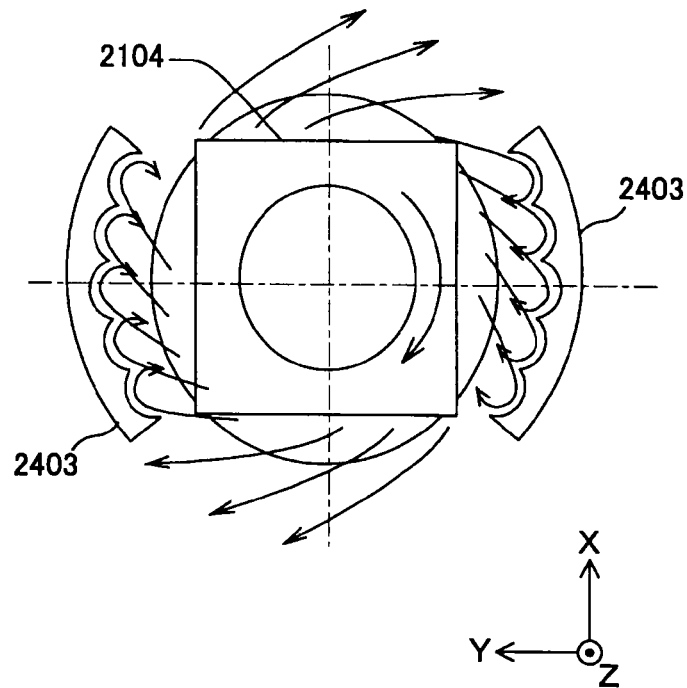
FIG. 13 is a schematic diagram illustrating a second modification of the flow guide wall.

As illustrated in FIGS. 12 and 13 as an example, protrusions and grooves may be formed on the inner surfaces of the flow guide walls 2403 such that the shape of a cross section perpendicular to the axis of rotation of the polygon mirror 2104 is wavy.

Figure 14:
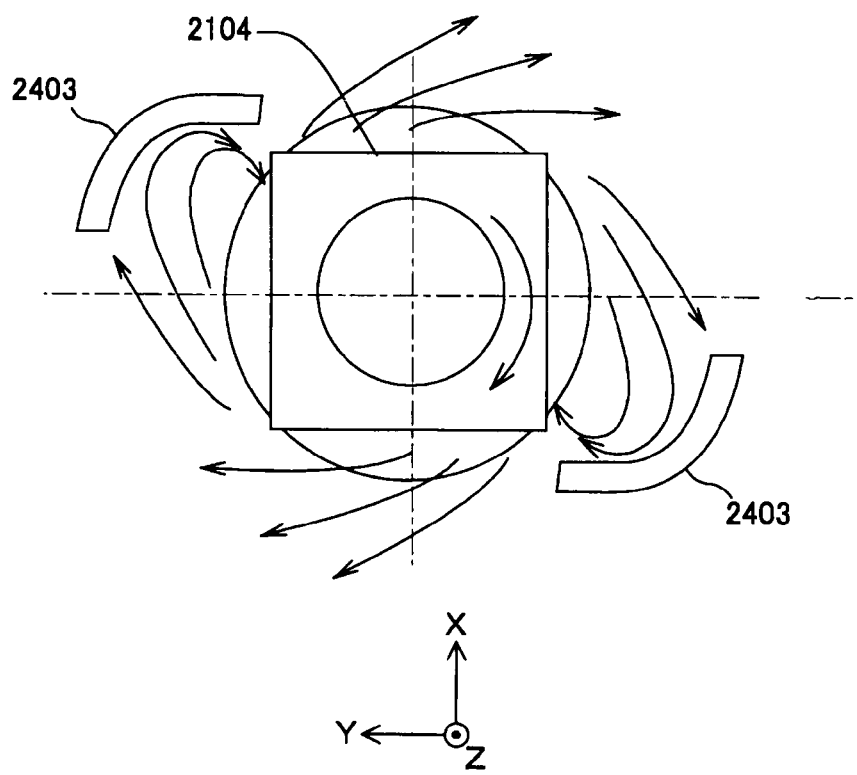
FIG. 14 is a schematic diagram illustrating a third modification of the flow guide wall.

In addition, as illustrated in FIG. 14 as an example, the flow guide walls 2403 may be arranged in a position to dam up a flow of air on the downstream side.

Figure 15:
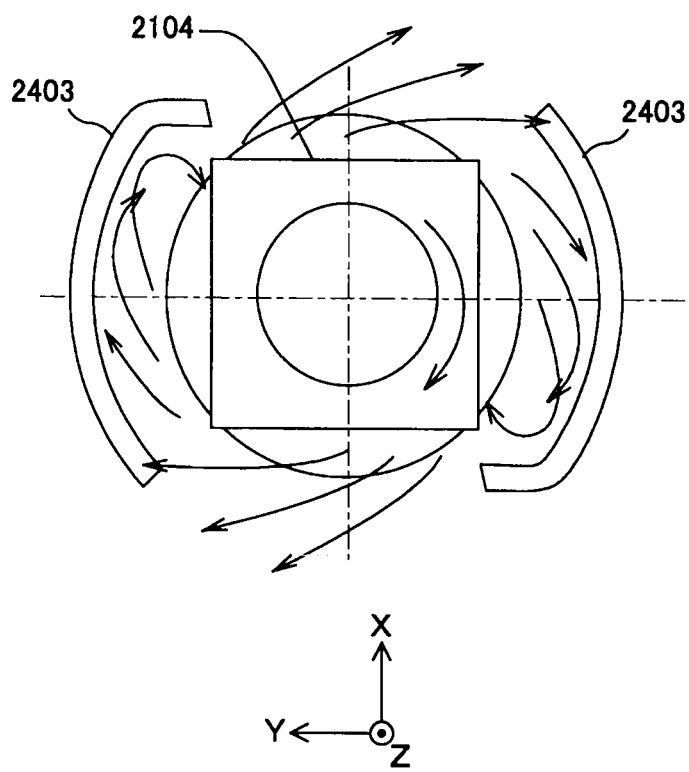
FIG. 15 is a schematic diagram illustrating a fourth modification of the flow guide wall.

Furthermore, as illustrated in FIG. 15 as an example, the flow guide walls 2403 may be arranged to surround the polygon mirror 2104 except areas through which light beams incident on the polygon mirror 2104 or light beams reflected by the polygon mirror 2104 pass.

In the examples, the flow guide walls 2403 are integrated with the core unit 2410.

As described above, the optical scanning device 2010 according to the present embodiment includes the light source module, the half mirror HM, the five reflecting mirrors (Ma1, Ma2, Mb1, Mb2, Mb3), the two cylindrical lenses (2204A, 2204B), the polygon mirror 2104, the two scanning lenses (2105A, 2105B), and the ten bending mirrors (2106a, 2106b, 2106c, 2106d, 2107a, 2107b, 2107c, 2107d, 2108a, and 2108d).

The optical scanning device 2010 also has the two flow guide walls 2403 that are provided near the polygon mirror 2104 and make flows of air generated by the rotation of the polygon mirror 2104 return back to the polygon mirror 2104.

In this case, the reflective surfaces of the polygon mirror 2104 can be prevented from being stained, and hot air blown onto the scanning lenses or the like can be suppressed. In addition, because the windage loss becomes smaller, the electric power required for the high-speed rotation of the polygon mirror 2104 can be reduced. Furthermore, because an air-cooling fan is not necessary, an increase in power consumption and noise can be suppressed.

Accordingly, stable optical scanning can be performed without increasing power consumption or noise.

Because the color printer 2000 according to the present embodiment includes the optical scanning device 2010, high quality image can be formed without increasing power consumption or noise.

In the embodiment described above, the case in which each light source has an end-face emitting laser as a light-emitting device has been described. However, it is not limited to the case, and each light source may have a vertical-cavity surface-emitting laser (VCSEL).

In the embodiment described above, the case in which each light source has two light-emitting units has been described. However, it is not limited to the case, and each light source may have one light-emitting element, or may have three or more light-emitting units.

In the embodiment described above, the case in which the image forming apparatus has four photosensitive drums has been described. However, it is not limited to the case, and the image forming apparatus may have two photosensitive drums. Alternatively, the image forming apparatus may have five or six photosensitive drums.

In the embodiment described above, transferring a toner image from photosensitive drums onto a recording sheet may be performed by a direct transfer method in which the image is transferred directly from the photosensitive drums onto the recording sheet.

In the embodiment described above, the case of using the color printer 2000 as an image forming apparatus has been described. However, it is not limited to the case, and an optical plotter or a digital copying apparatus may be used.

In addition, the image forming apparatus may use a silver halide film as an image carrier. In this case, a latent image is formed on the silver halide film by optical scanning, and this latent image can be visualized by a process that is the same as the developing process in a conventional film photographic process. The image thus visualized can be transferred to a sheet of photographic paper as an object to be transferred in a process that is the same as the printing process in a conventional film photographic process. Such an image forming apparatus can be fabricated as a photoengraving apparatus, or an optical drawing apparatus that draws a computed tomography (CT)-scanned image or the like.

Furthermore, the image forming apparatus may use as an image carrier a coloring medium (positive photographic paper) with which color appears in response to the thermal energy applied in a beam spot. In this case, a visualized image can be formed directly on the image carrier by optical scanning.

In other words, any image forming apparatus will suffice as long as it includes the optical scanning device 2010 described above.

According to the present invention, stable optical scanning can be performed without increasing the power consumption or the noise.

According to the present invention, a high-quality image can be formed without increasing the power consumption or the noise.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that optically scans a surface to be scanned in a main-scanning direction, the optical scanning device comprising:
   a light source;
   an optical deflector that has a reflective surface including an upstream side and a downstream side, the optical deflector rotates about an axis of rotation and deflects a light beam emitted from the light source;
   a scanning optical system that guides the light beam deflected by the optical deflector to the surface to be scanned; and
   a flow guide member that is provided near the optical deflector,
   wherein the flow guide member includes at least one guide surface that is one of angled and curved such that the at least one guide surface deflects a flow of air generated by the upstream side of the reflective surface during rotation of the optical deflector so as to flow in a direction towards the downstream side of the reflective surface, and
   wherein the flow guide member includes a first guide surface and the at least one guide surface includes a second guide surface that extends from the first guide surface at a substantially right angle.

2. The optical scanning device according to claim 1, wherein the flow guide member surrounds the optical deflector except in an area through which the light beam incident on the optical deflector and the light beam deflected by the optical deflector pass.

3. The optical scanning device according to claim 2, wherein
   the flow guide member includes two wall-shaped members facing each other in a direction perpendicular to the axis of rotation with the optical deflector interposed therebetween, and
   a shape of one of the two wall-shaped members rotated by 180° on the axis of rotation coincides with a shape of the other one of the two wall-shaped members.

4. The optical scanning device according to claim 1, wherein the flow guide member includes a wall surface that dams up a downstream flow of air flowing along the reflective surface on the downstream side of the reflective surface.

5. The optical scanning device according to claim 1, wherein the optical deflector is included in a housing, and wherein the flow guide member is integrated with the housing.

6. The optical scanning device according to claim 1, wherein the second guide surface is straight and the first guide surface is curved, and
   wherein a length of the first guide surface is greater than a length of the second guide surface.

7. An image forming apparatus comprising:
   at least one image carrier including a surface to be scanned; and
   an optical scanning device that optically scans the surface to be scanned in a main-scanning direction, wherein
   the optical scanning device includes
   a light source;
   an optical deflector that has a reflective surface including an upstream side and a downstream side, the optical deflector rotates about an axis of rotation and deflects a light beam emitted from the light source;
   a scanning optical system that guides the light beam deflected by the optical deflector to the surface to be scanned; and
   a flow guide member that is provided near the optical deflector,
   wherein the flow guide member includes at least one guide surface that is one of angled and curved such that the at least one guide surface deflects a flow of air generated by the upstream side of the reflective surface during rotation of the optical deflector so as to flow in a direction towards the downstream side of the reflective surface,
   wherein the flow guide member includes a first guide surface and the at least one guide surface includes a second guide surface that extends from the first guide surface at a substantially right angle, and
   wherein the optical scanning device scans the at least one image carrier with light modulated based on image information.

8. The image forming apparatus according to claim 7, wherein the image information is color image information in multiple colors.

9. The image forming apparatus according to claim 7, wherein the second guide surface is straight and the first guide surface is curved, and
   wherein a length of the first guide surface is greater than a length of the second guide surface.

* * * * *